US008933731B2

(12) United States Patent
Goyal et al.

(10) Patent No.: US 8,933,731 B2
(45) Date of Patent: Jan. 13, 2015

(54) BINARY ADDER AND MULTIPLIER CIRCUIT

(71) Applicants: Rohit Goyal, Sirsa (IN); Amit Kumar Dey, Kolkata (IN); Naman Gupta, Delhi (IN)

(72) Inventors: Rohit Goyal, Sirsa (IN); Amit Kumar Dey, Kolkata (IN); Naman Gupta, Delhi (IN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/077,198

(22) Filed: Nov. 11, 2013

(65) Prior Publication Data

US 2014/0253215 A1     Sep. 11, 2014

Related U.S. Application Data

(63) Continuation-in-part of application No. 13/794,739, filed on Mar. 11, 2013.

(51) Int. Cl.
*H03B 19/00* (2006.01)
*G06F 7/527* (2006.01)
*G06F 7/507* (2006.01)

(52) U.S. Cl.
CPC .............. *G06F 7/5272* (2013.01); *G06F 7/507* (2013.01)
USPC .......................................... 327/116; 327/119

(58) Field of Classification Search
USPC .......................................... 327/16, 119–122
See application file for complete search history.

(56) References Cited

U.S. PATENT DOCUMENTS

| | | | |
|---|---|---|---|
| 4,807,175 A | 2/1989 | Tokumaru | |
| 4,887,232 A | 12/1989 | Wolrich | |
| 5,031,135 A | 7/1991 | Blasco | |
| 5,357,457 A | 10/1994 | Terane | |
| 6,167,420 A | 12/2000 | Saishi | |
| 6,202,078 B1 | 3/2001 | Kikuchi | |
| 6,647,404 B2 * | 11/2003 | Tzeng et al. ................... 708/628 |
| 7,139,789 B2 | 11/2006 | Evans | |
| 2005/0091299 A1 | 4/2005 | Jhang | |

OTHER PUBLICATIONS

Cooper, A.R., Parallel architecture modified Booth multiplier, Electronic Circuits and Systems, IEE Proceedings G, vol. 135, Issue 3, Jun. 1988, pp. 125-128.
Yiran Chen, Hai Li, Kaushik Roy and Cheng-kok Koh, Cascaded Carry Select Adder (C2SA): A New Structure for Low-Power CSA Design, ISBN: 1-59593-137-6, Low Power Electronics and Design, 2005, pp. 115-118.
Sabyasachi Das and Sunil P. Khatri, "Area-reducing Sharing of Mutually Exclusive Multiplier, MAC, Adder and Subtractor blocks," presentation circa 2007.

* cited by examiner

*Primary Examiner* — Dinh Le
(74) *Attorney, Agent, or Firm* — Charles Bergere

(57) ABSTRACT

An adder circuit includes first through fourth two-bit adder modules, and first through third result mux blocks for receiving and adding first and second binary values to generate a final sum. A multiplier circuit that multiplies a multiplier and a multiplicand includes a multiplexer, an encoder connected to the multiplexer, a shifter connected to the encoder, and an accumulator connected to the encoder for receiving the multiplier and multiplicand and generating a multiplication product.

7 Claims, 6 Drawing Sheets

BINARY ADDER AND MULTIPLIER CIRCUIT

RELATED APPLICATIONS

The present application is a continuation-in-part (CIP) of U.S. patent application Ser. No. 13/794,739, filed on Mar. 11, 2013, the entire disclosure of which is hereby incorporated herein by reference.

BACKGROUND OF THE INVENTION

The present invention generally relates to digital circuits, and, more particularly, to a binary adder and multiplier circuit.

With the advent of technologies that require complex and fast data processing, digital systems have evolved to more quickly perform mathematical operations. Since multiplication and addition are the most basic forms of mathematical operations performed by digital systems, different algorithms, such as the ripple-carry adder algorithm and Booth's multiplication algorithm, have been developed to reduce the time for a digital system to add and multiply two numbers.

The ripple-carry adder algorithm requires using multiple full-adders to add N-bit numbers. Each full adder is provided an intermediate sum generated by a previous full adder. Although the implementation of the ripple-carry adder is simple, which translates into low design time overhead, the ripple-carry adder is slow, since each full adder must wait for a carry bit to be calculated by the previous full adder.

Carry look ahead (CLA) adders have been developed to reduce computation time. CLA adders operate by creating two signals (P and G) for each bit position, based on whether a carry is propagated from a less significant bit position (at least one input is a binary one), generated in that bit position (both inputs are binary one), or eliminated in that bit position (both inputs are binary zero). In most cases, P is simply the sum output of a half-adder and G is a carry output of the same adder. After P and G are generated the carries for each bit position are created. CLA adders are fast and solve the shortcomings of ripple-carry adders. However, CLA adders require considerable additional logic to perform the pre-calculation of P and G, which impacts silicon area.

Booth's multiplication algorithm performs multiplication using shift and add operations. A conventional Booth's multiplier includes a multiplexer or mux, an accumulator, and a binary shifter. A first mux input receives the multiplicand and a second mux input receives binary zero. Bits of a multiplier are provided serially to a select input of the mux by right-shifting and providing the least significant bit (LSB) first. The mux output is provided to the accumulator. The multiplicand is added to a previous intermediate result stored in the accumulator for bits of the multiplier that are set to one and the result is right-shifted. The previous intermediate result is right-shifted, without the addition of the multiplicand, for the bits of the multiplier that are set to zero.

Since the intermediate result stored in the accumulator must be shifted for each bit of the multiplier, generating a final result requires a count of clock cycles equal to the bit-length of the multiplier, regardless of a value of the bit. Thus, 8 clock cycles are required for multiplying an 8-bit multiplier and multiplicand, and 16 clock cycles are required for multiplying a 16-bit multiplier and multiplicand. The number of clock cycles, and therefore the time required for multiplication increases in direct proportion to the bit-length of the multiplier, which limits the performance of the conventional Booth multiplier.

It would therefore be advantageous to have an adder and multiplier circuit that is fast, consumes fewer clock cycles and requires less logic, and that overcome the above-mentioned limitations of conventional adder and multiplier circuits.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

Figure 1:
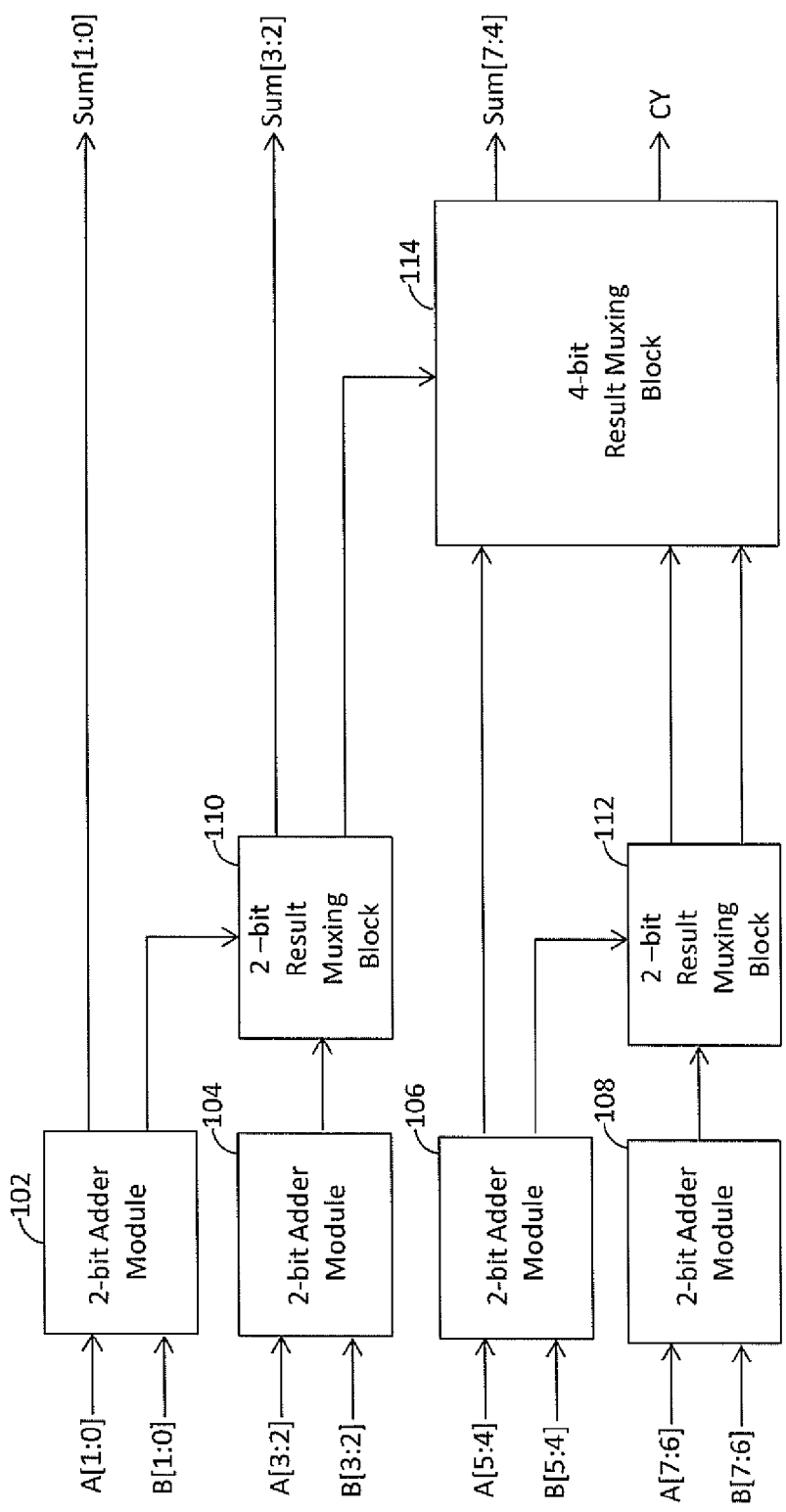
FIG. 1 is a schematic block diagram depicting an 8-bit adder circuit, in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. As used herein the terms multiplexer and multiplexing has been abbreviated as mux and muxing, respectively.

In an embodiment of the present invention, an adder circuit for adding first and second binary values to generate a final binary sum is provided. The adder circuit includes a first adder module for receiving zeroth and first bits of the first and second binary values and generating zeroth and first bits of the final binary sum and a first carry value. The adder circuit further includes a second adder module for receiving second and third bits of the first and second binary values and generating a first intermediate sum and a second carry value. The adder circuit further includes a first result mux block, connected to the first and second adder modules, for receiving the first carry value, the first intermediate sum, and the second carry value and generating second and third bits of the final binary sum and a third carry value. A third adder module receives fourth and fifth bits of the first and second binary values and generates a second intermediate sum and a fourth carry value. A fourth adder module receives sixth and seventh bits of the first and second binary values and generates a third intermediate sum and a fifth carry value. A second result mux block, connected to the third and fourth adder modules, receives the fourth carry value, the third intermediate sum, and the fifth carry value, and generates a fourth intermediate sum and a sixth carry value. A third result mux block, connected to the first and second result mux blocks and the third adder module, receives the third carry value, the second and fourth intermediate sums, and the sixth carry value, and generates fourth through seventh bits of the final binary sum and a seventh carry value.

In another embodiment of the present invention, a multiplier circuit for multiplying a first number (multiplier) including first and second partial multipliers, and a second number (multiplicand) is provided. The multiplier circuit includes a mux having an input terminal for receiving the multiplier, a select input terminal for receiving a select signal, and an output terminal for providing at least one of the first and second partial multipliers based on the select signal. An encoder is connected to the output terminal of the mux for receiving the at least one of the first and second partial multipliers, setting a most significant bit (MSB) of the at least one of the first and second partial multipliers to binary one, detecting a least significant set bit (LSB) in the at least one of the first and second partial multipliers, generating a position difference value that includes a difference between positions of the first and second LSBs detected in current and previous multiplication cycles, respectively, and generating a result acknowledgement signal when the multiplication of the multiplier and the multiplicand is finished. A shifter circuit is connected to the encoder for receiving the position difference value and a first intermediate product, and generating a second intermediate product by right-shifting the first intermediate product by a count equal to the position difference value. The first intermediate product is generated in the previous multiplication cycle. The second intermediate product includes a second MSB intermediate product and a second LSB intermediate product. An accumulator is connected to the shifter circuit for receiving the second MSB intermediate product and the multiplicand, adding the multiplicand to the second MSB intermediate product to generate a first MSB intermediate product, appending the first MSB intermediate product to the second LSB intermediate product to generate a third intermediate product, and transmitting the third intermediate product to the shifter circuit. A final product of the multiplier and the multiplicand is generated subsequent to the encoder detecting each set bit in each of the first and second partial multipliers.

In yet another embodiment of the present invention, a method for multiplying two numbers (a multiplier and a multiplicand) is provided. The multiplier includes first and second partial multipliers. At least one of the first and second partial multipliers is selected. A MSB of the selected partial multiplier is set to binary one. Subsequently, the LSB of the selected partial multiplier is detected. A position difference value that includes a difference between positions of first and second LSBs detected in current and previous multiplication cycles, respectively, is generated. Thereafter, a second intermediate product is generated by right-shifting a first intermediate product by a count equal to the position difference value. The second intermediate product includes a second most significant bit (MSB) intermediate product and a second LSB intermediate product. Subsequently, the multiplicand is added to the second MSB intermediate product to generate a first MSB intermediate product and the first MSB intermediate product is appended to the second LSB intermediate product to generate the third intermediate product. A result acknowledgement signal is generated when the multiplication of the multiplier and the multiplicand is finished and a final product is generated. The final product is generated subsequent to detecting each set bit in each of the first and second partial multipliers.

Various embodiments of the present invention provide an adder circuit that includes first through fourth two-bit adder modules, and first through third result mux blocks for receiving and adding the first and second binary values to generate a final binary sum. The adder circuit uses the inherent property of binary addition in which modification of a bit due to the carry from previous results can be performed by simply inverting that bit. Using this property enables implementation with very little logic and reduces the worst path delay significantly as compared to conventional adder circuits. Further, the gains of simpler implementation logic increase exponentially with an increase in widths of the first and second binary values. As a result, the addition operation is fast. The adder circuit requires less silicon area, which translates into significant performance gains and lower product cost.

Various embodiments of the present invention also provide a multiplier circuit for multiplying a multiplier and a multiplicand. The multiplier circuit includes a mux, an encoder connected to the mux, a shifter circuit connected to the encoder, and an accumulator connected to the encoder for receiving the multiplier and multiplicand and generating a multiplication product. The multiplier circuit uses fewer multiplication cycles as compared to conventional multiplication algorithms for generating the final multiplication product, which allows for significant performance gains. Further, the multiplier circuit uses fewer clock cycles for performing the multiplication operation. As a result, clock power dissipation is reduced.

Referring now to FIG. 1, a schematic block diagram of an adder circuit 100 for adding first and second binary values, in accordance with an embodiment of the present invention, is shown. The adder circuit 100 is an 8-bit adder and includes first through fourth two-bit adder modules 102-108, first and second two-bit result mux blocks 110 and 112, and a four-bit result mux block 114.

The first two-bit adder module 102 receives zeroth and first bits of the first and second binary values A[1:0] and B[1:0], respectively. The first two-bit adder module 102 generates zeroth and first bits of a final binary sum S[1:0] and a first carry value by adding corresponding bits of the first and second binary values received by the first two-bit adder module 102. The second two-bit adder module 104 is provided second and third bits of the first and second binary values A[3:2] and B[3:2], respectively. The second two-bit adder module 104 generates a first intermediate sum and a second carry value. The first two-bit result mux block 110 receives the first carry value, the first intermediate sum, and the second carry value from the first and second two-bit adder modules 102 and 104. Thereafter, the first two-bit result mux block 110 generates second and third bits of the final binary sum S[3:2] and a third carry value.

The third two-bit adder module 106 receives fourth and fifth bits of the first and second binary values A[5:4] and B[5:4] and generates a second intermediate sum and a fourth carry value. The fourth two-bit adder module 108 receives sixth and seventh bits of the first and second binary values A[7:6] and B[7:6] and generates a third intermediate sum and a fifth carry value. The second two-bit result mux block 112 receives the fourth carry value, the third intermediate sum, and the fifth carry value from the third and fourth two-bit adder modules 106 and 108 and generates a fourth intermediate sum and a sixth carry value.

The four-bit result mux block 114 receives the third carry value from the first two-bit result mux block 110, the second intermediate sum from the third two-bit adder module 106, and the fourth intermediate sum and the sixth carry value from the second two-bit result mux blocks 112. Subsequently, the four-bit result mux block 114 generates fourth through seventh bits of the final binary sum S[7:4] and a seventh carry value CY.

Figure 2:
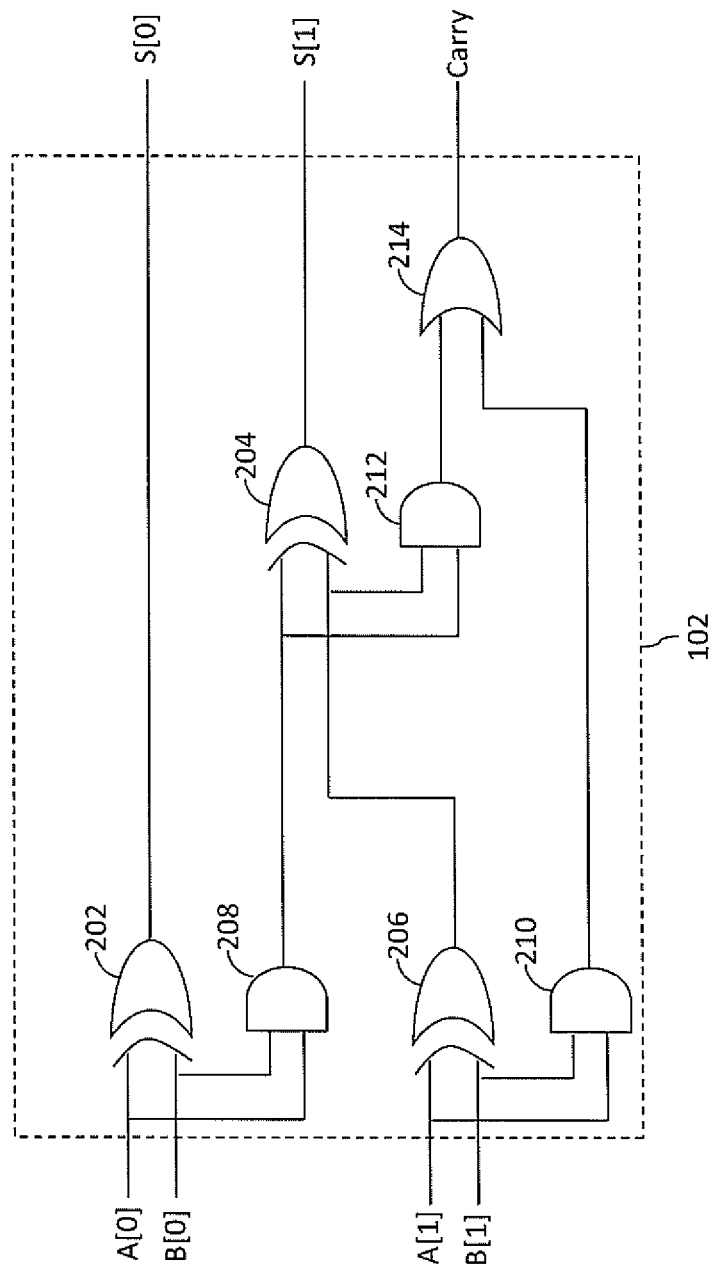
FIG. 2 is a schematic block diagram depicting a two-bit adder module in accordance with an embodiment of the present invention.

Referring now to FIG. 2, a schematic block diagram of the first two-bit adder module 102 in accordance with an embodiment of the present invention is shown. The first two-bit adder module 102 includes first through third XOR gates 202-206, first through third AND gates 208-212, and an OR gate 214.

The first XOR gate 202 receives the zeroth bits of the first and second binary values A[0] and B[0], and generates the zeroth bit of the final binary sum S[0]. The first AND gate 208 is connected to the first XOR gate 202 and receives the zeroth bits of the first and second binary values A[0] and B[0] and generates a first intermediate bit at an output terminal thereof. The third XOR gate 206 receives the first bits of the first and second binary values A[1] and B[1] and generates a second intermediate bit at an output terminal thereof. Additionally, the second AND gate 210 is connected to the third XOR gate 206 and receives the first bits of the first and second binary values A[1] and B[1] and generates a third intermediate bit at an output terminal thereof.

The second XOR gate 204 is connected to the output terminal of the first AND gate 208 and the output terminal of the third XOR gate 206 and receives the first and intermediate bits and generates the first bit of the final binary sum S[1]. The third AND gate 212 is connected to input terminals of the second XOR gate 204 and receives the first and second intermediate bits and generates a fourth intermediate bit at an output terminal thereof. The OR gate 214 is connected to the output terminals of the second and third AND gates 210 and 212 and receives the third and fourth intermediate bits and generates the first carry value at an output terminal thereof.

Figure 3:
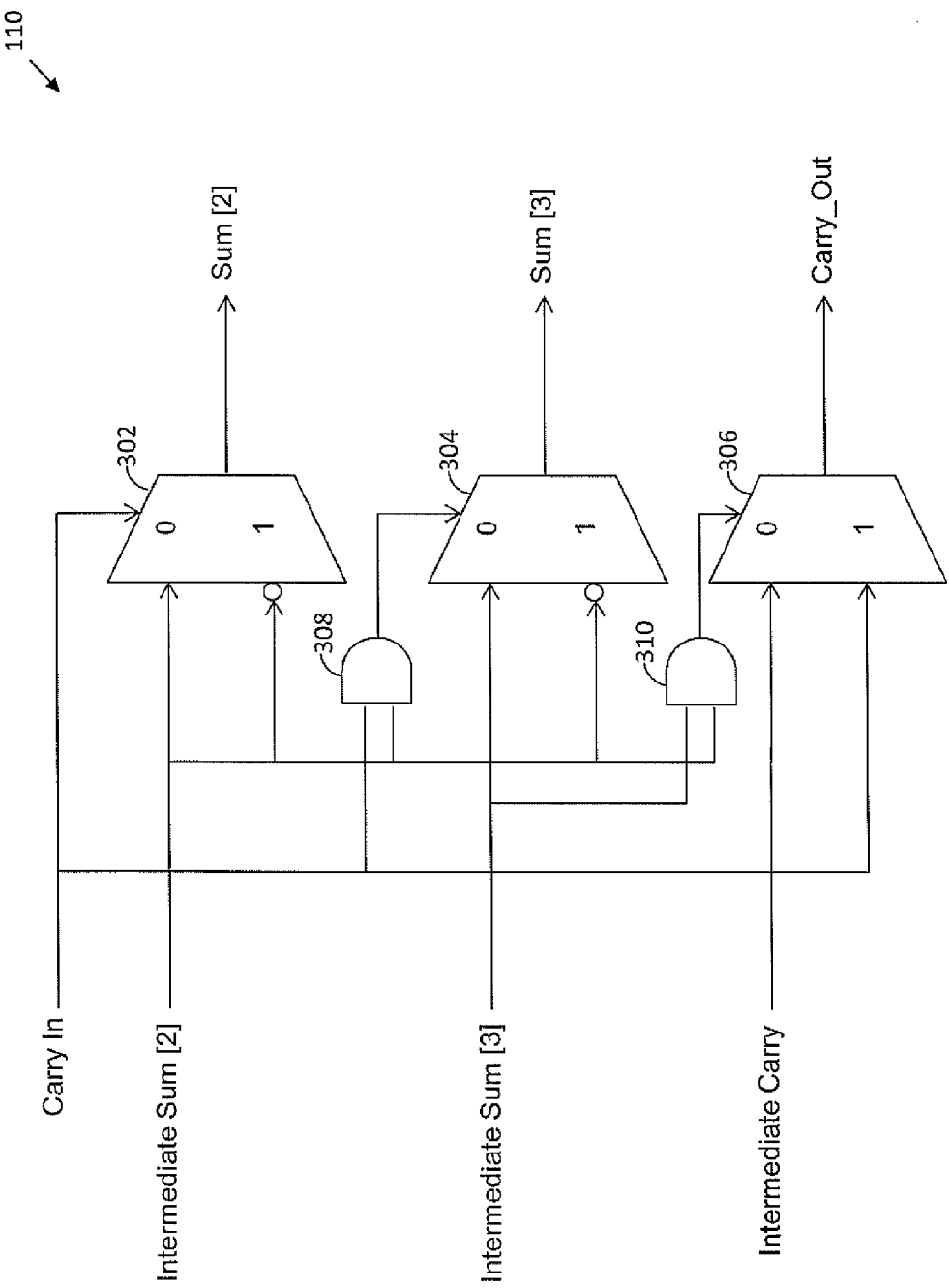
FIG. 3 is a schematic block diagram depicting a two-bit result multiplexer or mux block, in accordance with an embodiment of the present invention.

Referring now to FIG. 3, a schematic block diagram of the two-bit result mux block 110 in accordance with an embodiment of the present invention is shown. The two-bit result mux block 110 includes first through third multiplexers or muxes 302-306, and fourth and fifth AND gates 308 and 310. FIG. 3 will be explained in conjunction with FIG. 1.

The first mux 302 receives a zeroth bit of the first intermediate sum and an inverted zeroth bit of the first intermediate sum at first and second input terminals, and the first carry value at a select input terminal. The first mux 302 provides at least one of the zeroth and inverted zeroth bit as the third bit of the final binary sum.

The fourth AND gate 308 is connected to the first input terminal of the first mux 302 and receives the zeroth bit of the first intermediate sum and the first carry value and generates a fifth intermediate bit at an output terminal thereof. The second mux 304 receives a first bit of the first intermediate sum and an inverted first bit of the first intermediate sum at first and second input terminals, thereof, respectively, and the fifth intermediate bit at a select input terminal that is connected to the output terminal of the fourth AND gate 308. The second mux 304 provides at least one of the first bit and inverted first bit of the first intermediate sum as the fourth bit of the final binary sum based on the fifth intermediate bit provided at the select input terminal.

Further, the fifth AND gate 310 is connected to the first input terminals of the first and second muxes 302 and 304 and receives the zeroth and first bits of the first intermediate sum and generates a sixth intermediate bit at an output terminal thereof. The third mux 306 receives the first and second carry values at first and second input terminals thereof, respectively, and the sixth intermediate bit at a select input terminal that is connected to the output terminal of the fifth AND gate 310. The third mux 306 provides at least one of the zeroth and first bits of the first intermediate sum as the third carry value at an output terminal thereof.

Figure 4:
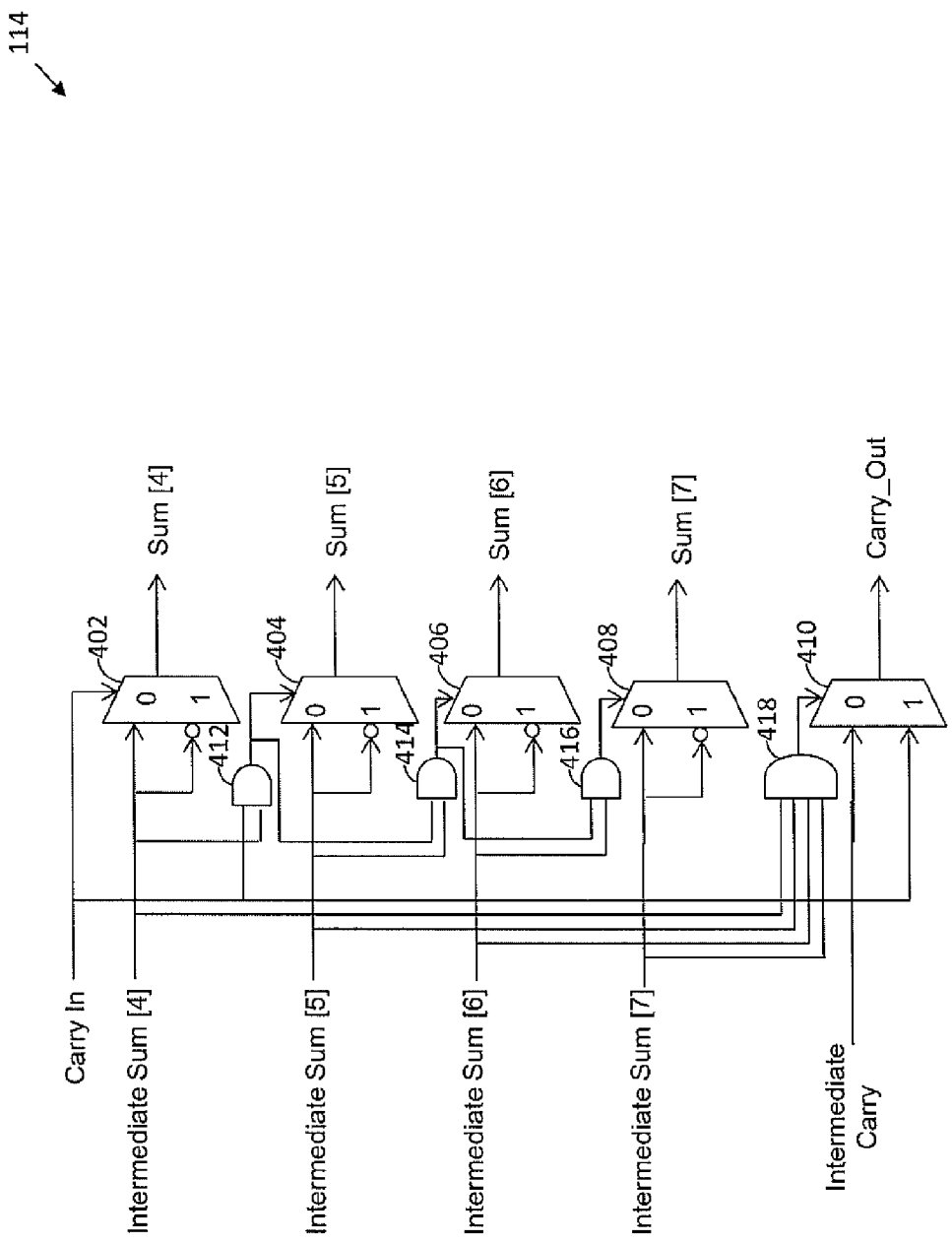
FIG. 4 is a schematic block diagram depicting a four-bit result mux block in accordance with an embodiment of the present invention.

Referring now to FIG. 4, a schematic block diagram of the four-bit result mux block 114 in accordance with an embodiment of the present invention is shown. The four-bit result mux block 114 includes fourth through eighth muxes 402-410, and sixth through ninth AND gates 412-418. FIG. 4 will be explained in conjunction with FIG. 1.

The fourth mux 402 receives a fourth bit of the second intermediate sum and an inverted fourth bit of the second intermediate sum at first and second input terminals thereof, respectively, and the third carry value at a select input terminal. The fourth mux 402 provides at least one of the fourth and inverted fourth bits of the second intermediate sum as the fourth bit of the final binary sum based on the third carry values at an output terminal thereof.

The sixth AND gate 412 is connected to the first input terminal of the fourth mux 402 and receives the fourth bit of the second intermediate sum and the third carry value and generates a seventh intermediate bit at an output terminal thereof. The fifth mux 404 receives a fifth bit of the second intermediate sum and an inverted fifth bit of the second intermediate sum at first and second input terminals thereof, respectively, and the seventh intermediate bit at a select input terminal that is connected to the output terminal of the sixth AND gate 412. The fifth mux 404 provides at least one of the fifth and inverted fifth bits of the second intermediate sum as the fifth bit of the final binary sum based on the seventh intermediate bit at an output terminal thereof. The seventh AND gate 414 is connected to the output terminal of the sixth AND gate 412 and to the first input terminal of the fifth mux 404 and receives the seventh intermediate bit and the fifth bit of the second intermediate sum. The seventh AND gate 414 generates an eighth intermediate bit at an output terminal thereof.

The sixth mux 406 receives a sixth bit of the fourth intermediate sum and an inverted sixth bit of the fourth intermediate sum at first and second input terminals thereof, respectively, and the eighth intermediate bit at a select input terminal that is connected to the output terminal of the seventh AND gate 414. The sixth mux 406 provides at least one of the sixth and inverted sixth bits of the fourth intermediate sum as the sixth bit of the final binary sum based on the eighth intermediate bit at an output terminal thereof.

The eighth AND gate 416 is connected to the output terminal of the seventh AND gate 414 and to the first input terminal of the sixth mux 406 and receives the eighth intermediate bit and the sixth bit of the fourth intermediate sum and generates a ninth intermediate bit at an output terminal thereof.

The seventh mux 408 receives a seventh bit of the fourth intermediate sum and an inverted seventh bit of the fourth intermediate sum at first and second input terminals thereof, respectively, and the ninth intermediate bit at a select input terminal that is connected to the output terminal of the eighth AND gate 416. The seventh mux 408 provides at least one of the seventh and inverted seventh bits of the fourth intermediate sum as the seventh bit of the final binary sum based on the ninth intermediate bit at an output terminal thereof.

The ninth AND gate 418 is connected to the first terminals of the fourth through seventh muxes 402-408 and receives the fourth and fifth bits of the second intermediate sum and the sixth and seventh bits of the fourth intermediate sum and generates a tenth intermediate bit at an output terminal thereof.

The eighth mux 410 receives the sixth and third carry values at first and second input terminals thereof, respectively, and the tenth intermediate bit at a select input terminal that is connected to the output terminal of the ninth AND gate 418. The eighth mux 410 provides at least one of the sixth and third carry values as the seventh carry value based on the tenth intermediate bit at an output terminal thereof.

The adder circuit 100 that has been described above is an eight-bit adder circuit that is capable of adding eight-bit wide first and second binary values. However, those of skill in the art will appreciate that the adder circuit 100 may be altered by adding two-bit adder modules and two-bit result mux blocks, and extending the four-bit result mux block to enable addition of the first and second binary values having more than eight bits.

Figure 5:
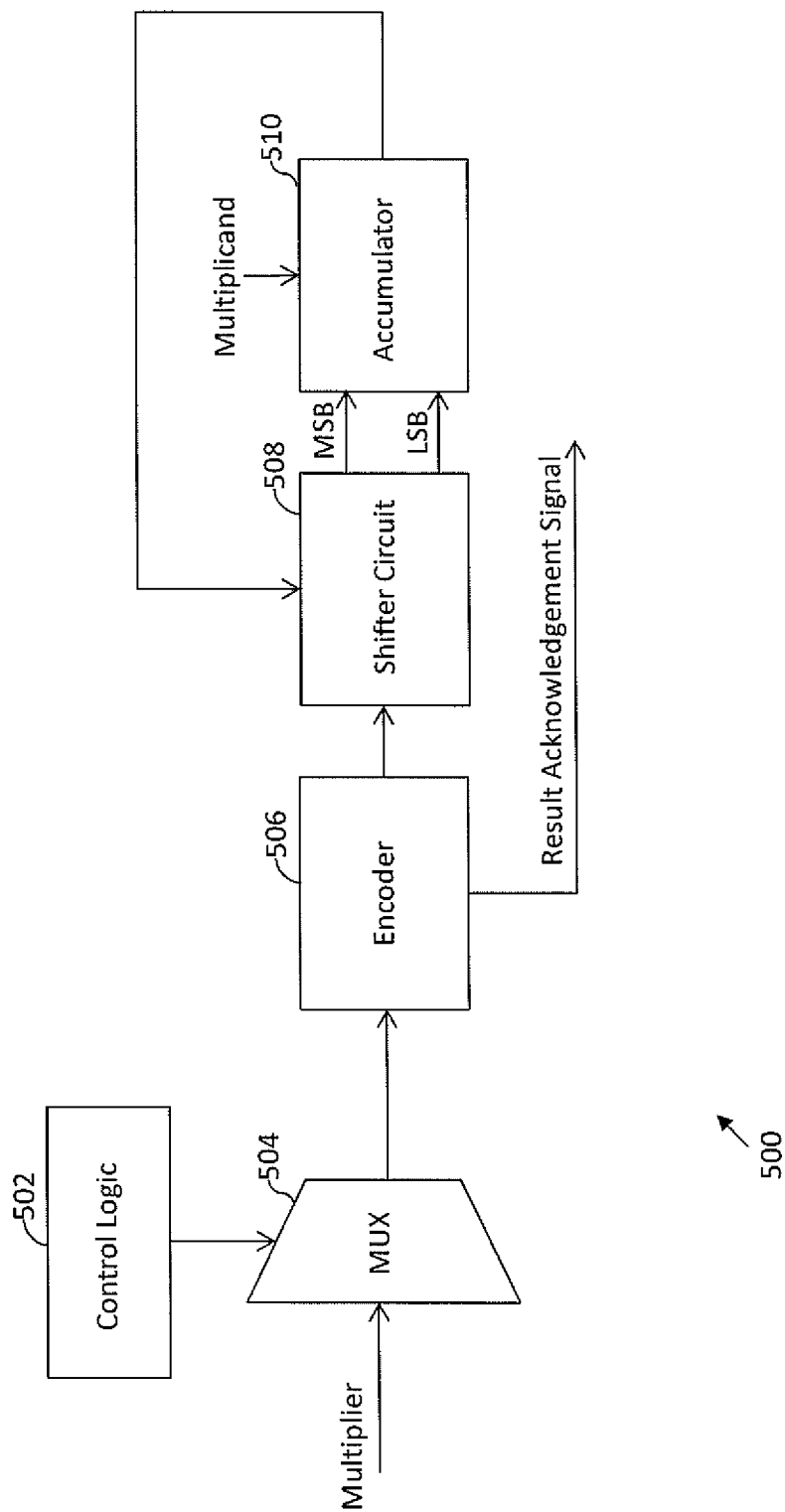
FIG. 5 is a schematic block diagram depicting a multiplier circuit in accordance with an embodiment of the present invention.

Referring now to FIG. 5, a schematic block diagram of a multiplier circuit 500 for multiplying a multiplier and a multiplicand in accordance with an embodiment of the present invention is shown. The multiplier circuit 500 includes a control logic 502, a ninth mux 504, an encoder 506, a shifter circuit 508, and an accumulator 510.

The ninth mux 504 receives the multiplier including first and second partial multipliers at first and second input terminals thereof, respectively, and a select signal at a select input terminal thereof, that is connected to the control logic 502. In an example, the multiplier is 16-bit wide and since each of the first and second input terminals of the ninth mux 504 is 8-bit wide, the multiplier is split into the first and second partial multipliers, each of which is 8-bit wide and subsequently provided to the first and second input terminals of the ninth mux 504. In another example, the multiplier is 32-bit wide. The ninth mux 504 has first through fourth input terminals, each of which is 8-bit wide and the multiplier is split into first through fourth partial multipliers, each of which is 8-bit wide. Subsequently, the first through fourth partial multipliers are provided to the first through fourth input terminals of the ninth mux 504. Likewise an N-bit wide multiplier ('N' being a multiple of 8) may be provided to the ninth mux 504 having first through N/8$^{th}$ input terminals. The multiplier is divided into N/8 partial multipliers and provided to the first through N/8$^{th}$ input terminals of the ninth mux 504.

The ninth mux 504 provides at least one of the first and second partial multipliers based on the select signal generated by the control logic 502. In an example, the multiplier is 16-bit wide. The first partial multiplier corresponds to a least significant bit (LSB) half of the multiplier and the second partial multiplier corresponds to a most significant bit (MSB) half of the multiplier. Therefore, the eight LSB bits correspond to the first partial multiplier and the eight MSB bits correspond to the second partial multiplier. Initially (i.e., in the first multiplication cycle), the ninth mux 504 selects and provides the first partial multiplier, i.e., the LSB half of the multiplier, at an output terminal thereof based on the select signal. In an example when more than two partial multipliers are provided to the ninth mux 504, a partial multiplier with lowest significance bits is selected in the first multiplication cycle followed with the selection in the subsequent multiplication cycle of a partial multiplier having immediately higher significance bits and so forth.

The encoder 506 is connected to the output terminal of the ninth mux 504 and receives at least one of the first and second partial multipliers therefrom. The encoder 506 sets a most significant bit (MSB) of the at least one of the first and second partial multipliers to binary one. In an example when more than two partial multipliers are provided to the multiplier circuit 500, the MSB of each partial multiplier is set by the encoder 506. Further, the encoder 506 detects a LSB in the at least one of the first and second partial multipliers and generates a position difference value that includes a difference between positions of first and second LSBs detected in current and previous multiplication cycles, respectively. Since the position value of the second LSB will not be available in the first multiplication cycle, the encoder 506 provides the position value of the first LSB as the position difference value. The encoder 506 also generates a result acknowledgement signal when the multiplication of the multiplier and the multiplicand is finished and a final product is generated. The final product of the multiplier and the multiplicand is generated subsequent to detecting each set bit in the first and second partial multipliers.

The shifter circuit 508 is connected to the encoder 506 and the accumulator 510 receives the position difference value from the encoder 506 and a first intermediate product from the accumulator 510. The shifter circuit 508 right-shifts the first intermediate product by a count equal to the position difference value to generate a second intermediate product. The first intermediate product is generated in a previous multiplication cycle by the shifter circuit 508 by right-shifting a string of zeros. The second intermediate product includes a second MSB intermediate product and a second LSB intermediate product in which the second MSB intermediate product corresponds to MSB half of the second intermediate product and the second LSB intermediate product corresponds to the LSB half of the second intermediate product. The shifter circuit 508 transmits the second MSB and LSB intermediate products to the accumulator 510.

The accumulator 510 receives the multiplicand and the second MSB and LSB intermediate products. The accumulator 510 adds the multiplicand and the second MSB intermediate product to generate a first MSB intermediate product. In an embodiment of the present invention, if the MSB of the at least one of the first and second partial multipliers that is being used in the current multiplication cycle is originally binary zero (i.e., before being explicitly set to binary one by the encoder 506), the accumulator 510 bypasses the addition of the multiplicand in a multiplication cycle corresponding to the MSB of the at least one of the first and second partial multipliers.

Thereafter, the accumulator 510 appends the first MSB intermediate product to the second LSB intermediate product to generate a third intermediate product. Subsequently, the accumulator 510 transmits the third intermediate product to the shifter circuit 508.

Figure 6:
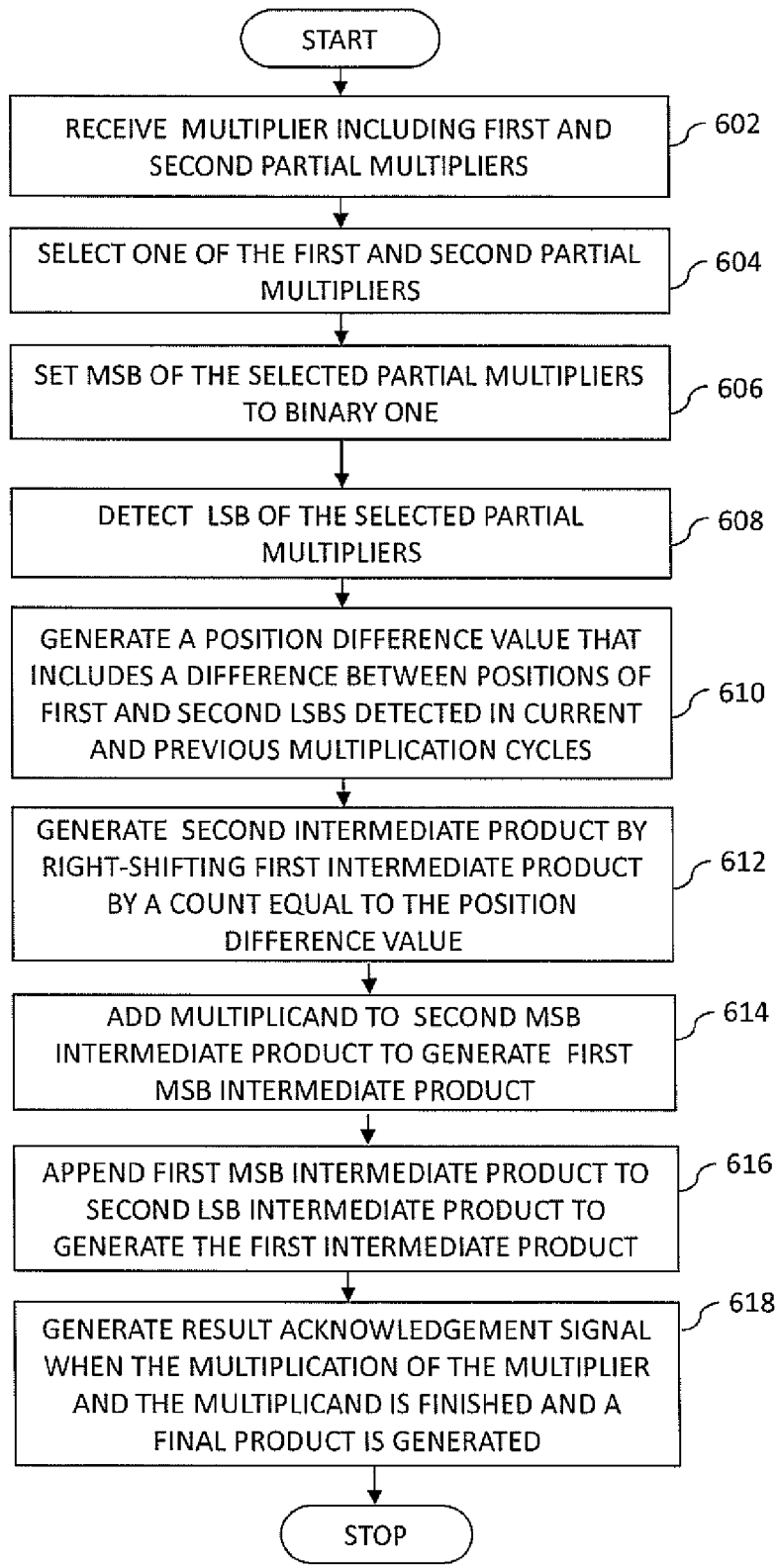
FIG. 6 is a flow chart depicting a method for multiplying two values in accordance with an embodiment of the present invention.

Referring now to FIG. 6, a flowchart depicting a method for multiplying a multiplier and a multiplicand in accordance with an embodiment of the present invention is shown.

At step 602, the multiplier including first and second partial multipliers is received by the ninth mux 504 at the first and second input terminals as described in conjunction with FIG. 5. Further, the ninth mux 504 also receives the select signal at the select input terminal from the control logic 502. At step 604, at least one of the first and second partial multipliers is selected by the ninth mux 504 based on the select signal as described in FIG. 5. The ninth mux 504 transmits the at least one of the first and second partial multipliers to the encoder 506. At step 606, a most significant bit (MSB) of the at least one of the first and second partial multipliers is set to binary one by the encoder 506. At step 608, the LSB of the at least one of the first and second partial multipliers is detected by the encoder 506 as described in conjunction with FIG. 5. At step 610, the position difference value that includes a difference between the positions of the first and second LSBs detected in current and previous multiplication cycles, respectively, is generated by the encoder 506. Subsequently, the encoder 506 transmits the position difference value to the shifter circuit 508. At step 612, a second intermediate product is generated by right-shifting the first intermediate product by the count equal to the position difference value. The second intermediate product includes the second MSB intermediate product and the second LSB intermediate product. Subsequently, the shifter circuit 508 transmits the second MSB and LSB intermediate products to the accumulator 510. At step 614, the multiplicand is added to the second MSB intermediate product to generate the first MSB intermediate product by the accumulator 510. In an embodiment of the present invention, if the MSB of the at least one of the first and second partial multipliers that is being used in the current multiplication cycle is originally binary zero (i.e., before being set to binary one explicitly by the encoder 506), the addition of the multiplicand in a multiplication cycle corresponding to the MSB of the at least one of the first and second partial multipliers is bypassed by the accumulator 510. At step 616, the first MSB intermediate product is appended to the second LSB intermediate product to generate a third intermediate product by the accumulator 510. Thereafter, the accumulator 510 transmits the third intermediate product to the shifter circuit 508. At step 618, a result acknowledgement signal is generated by the encoder 506 when the multiplication of the multiplier and the multiplicand is finished and a final product is generated. The final product of the multiplier and the multiplicand is generated subsequent to detecting each set bit in the first and second partial multipliers.

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A multiplier circuit for multiplying a multiplier and a multiplicand, comprising:
a multiplexer having an input terminal for receiving the multiplier, wherein the multiplier includes first and second partial multipliers, a select input terminal for receiving a select signal, and an output terminal for providing at least one of the first and second partial multipliers based on the select signal;
an encoder connected to the output terminal of the multiplexer for receiving the at least one of the first and second partial multipliers, setting a most significant bit (MSB) of the at least one of the first and second partial multipliers to binary one, detecting a least significant set bit (LSB) in the at least one of the first and second partial multipliers, generating a position difference value that includes a difference between positions of first and second LSBs detected in current and previous multiplication cycles, respectively, and generating a result acknowledgement signal when the multiplication of the multiplier and the multiplicand is finished;
a shifter circuit connected to the encoder for receiving the position difference value and a first intermediate product, and generating a second intermediate product by right-shifting the first intermediate product by a count equal to the position difference value, wherein the second intermediate product includes a second MSB intermediate product and a second LSB intermediate product; and
an accumulator connected to the shifter circuit for receiving the second MSB intermediate product and the multiplicand, adding the multiplicand to the second MSB intermediate product to generate a first MSB intermediate product, appending the first MSB intermediate product to the second LSB intermediate product to generate a third intermediate product, and transmitting the third intermediate product to the shifter circuit,
wherein the accumulator generates the first intermediate product in the previous multiplication cycle, wherein a final product of the multiplier and the multiplicand is generated subsequent to the encoder detecting each set bit in the at least one of the first and second partial multipliers.

2. The multiplier circuit of claim 1, further comprising a control logic circuit for generating the select signal based on a detection of one or more set bits in the at least one of the first and second partial multipliers.

3. The multiplier circuit of claim 1, wherein the first partial multiplier includes an MSB half of the multiplier.

4. The multiplier circuit of claim 1, wherein the second partial multiplier includes a LSB half of the multiplier.

5. A method for multiplying a multiplier and a multiplicand, the method comprising:
receiving the multiplier including first and second partial multipliers;
selecting at least one of the first and second partial multipliers;
setting a most significant bit (MSB) of the at least one of the first and second partial multipliers to binary one;
detecting a least significant set bit (LSB) of the at least one of the first and second partial multipliers;
generating a position difference value that includes a difference between positions of first and second LSBs detected in current and previous multiplication cycles, respectively;
generating a second intermediate product by right-shifting a first intermediate product by a count equal to the position difference value, wherein the second intermediate product includes a second MSB intermediate product and a second LSB intermediate product;
adding the multiplicand to the second MSB intermediate product to generate a first MSB intermediate product;
appending the first MSB intermediate product to the second LSB intermediate product to generate a third intermediate product; and
generating a result acknowledgement signal when the multiplication of the multiplier and the multiplicand is finished and a final product is generated, wherein the final product of the multiplier and the multiplicand is generated subsequent to detecting each set bit in the at least one of the first and second partial multipliers.

6. The method of claim 5, wherein the first partial multiplier includes an MSB half of the multiplier.

7. The method of claim 5, wherein the second partial multiplier includes a LSB half of the multiplier.

* * * * *